United States Patent [19]

Hipp

[11] 4,229,103
[45] Oct. 21, 1980

[54] APPARATUS FOR DETERMINING OFF-AIM DURING FIRING SIMULATION

[76] Inventor: Jan Hipp, SchulteBdamm 57, 2000 Hamburg 64, Fed. Rep. of Germany

[21] Appl. No.: 5,029

[22] Filed: Jan. 19, 1979

[30] Foreign Application Priority Data

Jan. 20, 1978 [DE] Fed. Rep. of Germany ....... 2802477

[51] Int. Cl.$^3$ ............................................. G01B 11/26
[52] U.S. Cl. ....................................... 356/141; 35/25; 250/553; 356/5; 356/152
[58] Field of Search ........................... 356/5, 141, 152; 250/552, 553; 35/25

[56] References Cited

U.S. PATENT DOCUMENTS

| | | | |
|---|---|---|---|
| 3,244,889 | 4/1966 | Preston et al. | 250/211 R |
| 3,590,248 | 6/1971 | Chatterton, Jr. | 250/199 |
| 3,617,131 | 11/1971 | Taguchi | 356/152 |
| 3,691,390 | 9/1972 | Chow et al. | 250/553 |
| 3,746,454 | 7/1973 | Pace et al. | 356/152 |
| 3,906,220 | 9/1975 | Delingat | 250/227 |
| 3,937,575 | 2/1976 | Bateman | 250/552 |
| 3,953,131 | 4/1976 | Britz | 356/141 |
| 4,099,879 | 7/1978 | Britz | 356/141 |

*Primary Examiner*—Stephen C. Buczinski
*Attorney, Agent, or Firm*—Arnold, White & Durkee

[57] ABSTRACT

A device for determining the position of a laser reflecting target with respect to a line of sight during shooting simulation is disclosed. Laser transmitting and/or receiving assemblies constructed from a plurality of opto-electronic elements for emitting or detecting laser light, respectively, are used to divide the field of view into a plurality of space angle sectors. Each of the opto-electronic elements have an active region for emitting or receiving laser light. Each region's area is smaller than the corresponding total cross-sectional area of the element. Each active region is coupled to an optical assembly by a light conductor. Each conductor has a cross-sectional area greater than the area of the active region to which it is connected, but is smaller than the element's total cross-sectional area. The unconnected ends of the light conductors for each assembly are placed together to form a gap-less arrangement in an image plane of the optical assembly. A programmed data processor controls the emission and detection of the laser light from these assemblies; and, from the transmitted and received signals, the computer is able to determine and display the off-aim position of the target.

15 Claims, 4 Drawing Figures

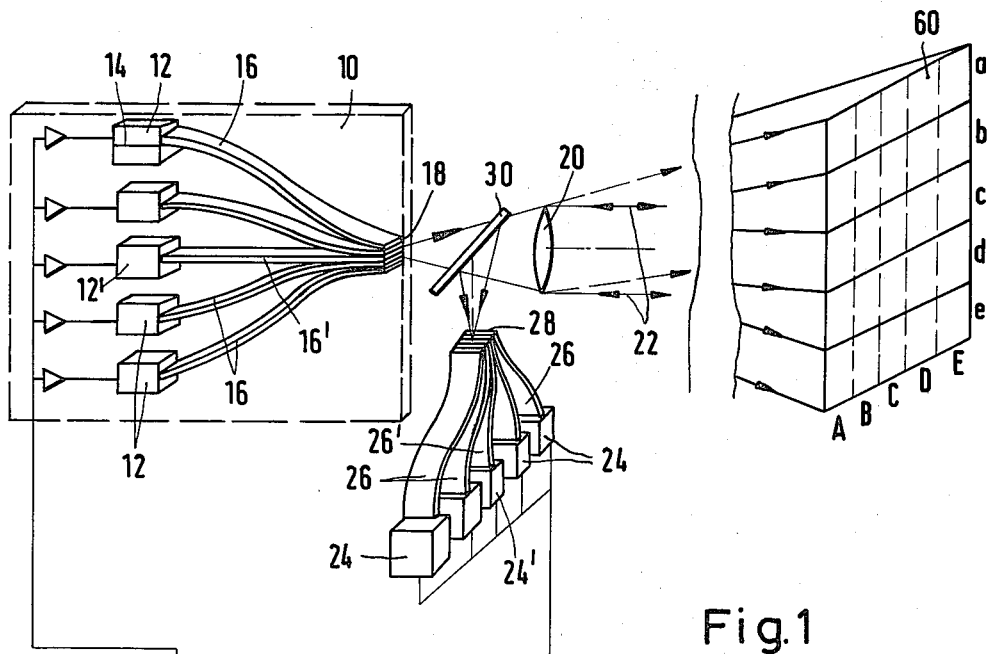
Fig.1
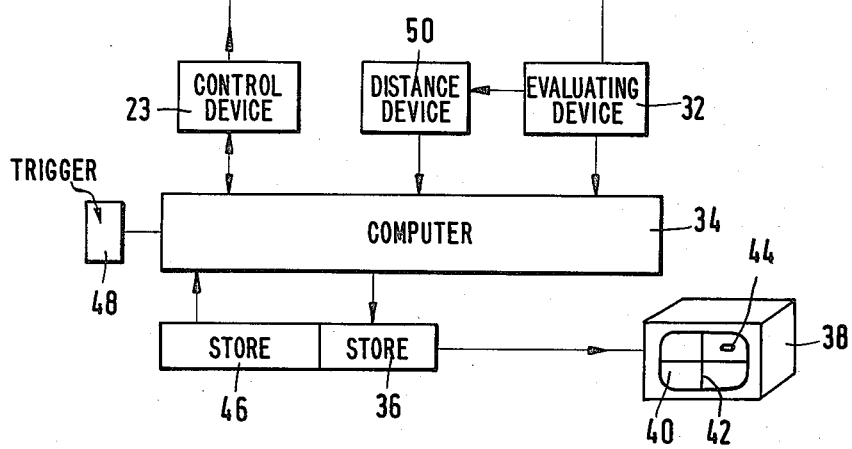
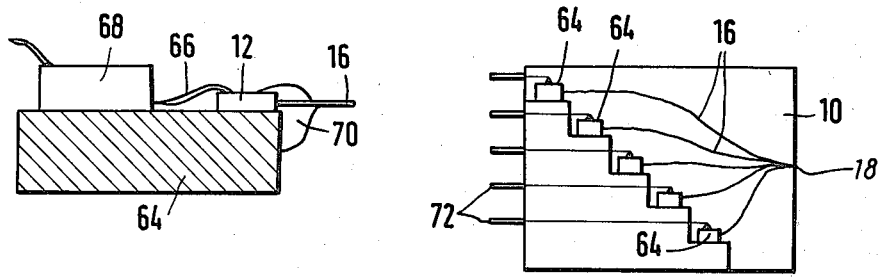
Fig.2 Fig.3

APPARATUS FOR DETERMINING OFF-AIM DURING FIRING SIMULATION

BACKGROUND OF THE INVENTION

The present invention relates to devices for transmitting and/or receiving laser light; more particularly, to laser transmitting-receiving devices for determining off-aim locations of a target during firing simulations.

Prior-art laser firing simulators which simulate "shots" are known in the art. These prior art laser firing simulators use laser light to simulate a fired projectile or missile from a weapon. Reflected laser light from the hit target is received to both differentiate between a hit and a miss and to determine the location of the hit target in relation to the line of sight of the sighting unit. By knowing the location of the target in the field of view of the sighting unit, a quantitative determination of the accuracy of the aim can be made. Two such prior-art devices are disclosed in West German Auslegeschrift No. 1,703,109 and West German Offenlegungschrift No. 2,149.729.

The laser firing simulator disclosed in the Auslegeschrift causes the laser beam simulating the shot to travel through a scanning pattern in relation to the line of sight. The simulator disclosed in the Offenlegungschrift emits the laser light with pulse coding, either successively or simultaneously. This pulse coded laser light is emitted through a plurality of gapless abutting space angle sectors. Each sector contains a receiving element that can respond to the reflected laser light that is received. Analysis of the sector receive signals generated by the reflected laser light permits a determination of in which sectors a reflection occured. In other words, the target region to be covered is divided into a matrix of individual sectors or fields, and the reflected laser light response signals indicate in which of these sectors the laser light reflecting target is located.

Various problems exist in respect to these prior-art devices. First, the emitted laser light bundles must be produced in such a manner that the space angle sectors are completely filled with laser light without gaps between adjacent sectors. Additonally, the laser light in each sector should be homogeneous and with a high energy density. One such prior art attempt to realize these requirements is to use semi-conductor laser diodes as the laser emitting element. These diodes are arranged in a matrix in the focal plane of an optical projection assembly adjusted to infinity. However, for such an arrangement, the actual light-emitting region for each element (and moreover, in all lasers) is considerably smaller than the total cross-sectional area of the element. For example, the p–n transition layer of a Ga-As laser diode, which generates laser light, has an approximate thickness of only 2 micrometers (um), whereas the total thickness of the laser diode amounts to at least 0.1 millimeter (mm), some fifty times larger. Even if such laser diodes were placed together side-by-side without gaps (an impossibility because of the necessary holders and electrical connections) the external dimensions of each diode, and not those of their active emission region, would determine the magnitude of the space angle sectors and the energy density contained therein. Additionally, a very inhomogeneous distribution of the emitted laser light would occur in every space angle sector.

A proposed solution to obtain homogeneity of the spatial distribution of the emitted light is to use light conductors connected to the light outlet faces of the laser diodes. Even for this solution, the energy density depends upon the external dimensions of the laser diode, and the resulting energy density in the space angle sectors is only a fraction of the energy density which is emitted from the active region of the laser diode.

A second problem in the prior-art devices arises from the fact that, for the arrangements known heretofore for emitting laser light into a number of space angle sectors, a similarly large number of individual lasers or laser diodes is required. For example, if it is desired to divide the total space angle to be covered into a 5×5 matrix, 25 laser light emitting elements, controllable with different pulse coding, are required. Consequently, relatively high cost expenditure is required.

Therefore, it would be advantageous to provide a laser firing simulator which achieves a homogeneous energy density in each space angle sector to completely cover any target in the field of view, and to reduce the number of laser emitting elements required to accomplish this result.

SUMMARY OF THE INVENTION

In accordance with this invention, a laser transmitting and receiving device is disclosed for determining the off-aim, i.e., the horizontal and lateral displacement of a laser reflecting target from a line of sight, of a weapon during shooting simulation. A plurality of opto-electronic elements, such as Ga-As laser diodes and avalanche receiving diodes, are used to generate and detect a laser light beam, respectively. Each of the opto-electronic elements have a line-like active region that is considerably smaller in dimension that the total cross-sectional area of the element. To each of the active regions of the diodes is attached a flat light carrying conducting whose cross-sectional area covers the active region, but is still smaller than the element's cross-sectional area. Thus, all of the laser light emitted or received is conducted out of or into each elements active region, respectively. Further, the conductors have a thickness which is considerably smaller than the width, and as a consequence, produces a narrow strip of light when connected to a laser diode. Likewise, a narrow strip of a received laser beam is transmitted to a receiving element through one of these conductors when a beam strikes the conductor's unconnected end.

A plurality of elements, either for transmitting or receiving, are constructed in an assembly such that the unconnected ends of the light conductors are arranged side-by-side (flat sides together) to form a gap-less parallel segmented surface that is positioned in an image plane of an optical assembly. The optical assembly projects the emitted laser beam from the emitting surface into the field of view towards the reflecting target, and focuses the reflected laser beam onto the receiving surface. A lens system and a beam splitter comprise the optical assembly. The focal length of the optical assembly can be fixed or, by the use of a zoom lens, can be variable. Thus, the image plane of the optical assembly, in relation to the receiving or transmitting surfaces, can be changed (de-focused). The surfaces formed by the side-by-side arrangement of the flat light conductors comprise an essentially square segmented area in which the area is divided into parallel strips, each strip associated with an optical element.

Two such opto-electronic element assemblies are provided, one for emitting a laser beam and one from receiving the reflected beam from the target. The optical assembly is coupled to the two assemblies by the beam splitter. The segmented light receiving surface is constructed such that the parallel strips are rotated about the optical axis of the optical assembly 90 degrees in relation to the parallel strips of the light emitting surface. The effect of this arrangement is to divide the laser beam cross-sectional area, and thus the field of view, into a matrix of space angle sectors or regions. Thus, for n elements in both the emitting and receiving assemblies, the laser beam is divided into $n^2$ space angle sectors.

Connected to the transmitting and receiving element assemblies is a programmed computer which has an optical display unit attached thereto. The computer generates transmit commands to the laser emitting diodes to produced sequential, simultaneous or coded emissions from the diodes. The signals produced by the receiving diodes are monitored by the computer and a distance measuring unit to produce information which, when combined with the laser transmit commands, enables the computer to determine the location of the laser reflecting target in relation to a line of sight. Other information is also provided to the computer, such as the type of ammunition, in order to make the aim determination. The optical display unit connected to the computer provides a visual presentation of the target with respect to a line of signal that is represented in the display by a set of crosshairs.

The arrangement of the two opto-electronic element assemblies may be varied such that both assemblies are either for laser emission or laser detecton. In such cases, a separate laser receiver or transmitter must be provided, and the computer programming changed to generate the appropriate transmit commands and to process the detection signals from the receiving elements.

As mentioned above, a matrix-like division of the laser beam, and thus the field of view, into $n \times n$ fields is realized with the use of only $2 \times n$ opto-electronic elements. By monitoring the response signals from the receiving elements and by knowing which emitting elements produced the laser light, the target's location within the space angle sectors can be determined. However, by comparing the intensity between the signals associated with the various transmitting and/or receiving elements (interpolation), a higher accuracy of the off-aim determination can be obtained.

The off-aim determining device may be mounted to a weapon, such as an anti-tank rocket launcher where the sighting unit must "hold-on" to the target during the missile flight time in order to guide the missile to the target. The laser beam is aligned true to the weapons aiming direction so that during "shooting simulation", the shooter has an accurate visual presentation of the target's location in respect to the aiming direction to help the shooter aim his weapon.

BRIEF DESCRIPTION OF THE DRAWINGS

The invention will be further described, by way of example, with reference to the accompanying drawings, in which:

FIG. 1 illustrates diagrammatically the construction of a preferred off-aim location determination apparatus for firing simulation, with a transmitter and/or receiver for laser light;

FIG. 2 illustrates a section through a single opto-electronic transmitting element of the transmitter;

FIG. 3 illustrates a side view of the laser transmitter; and

Similar reference characters refer to similar parts throughout the several views of the drawings.

DETAILED DESCRIPTION OF THE PREFERRED EMBODIMENTS

Figure 4:
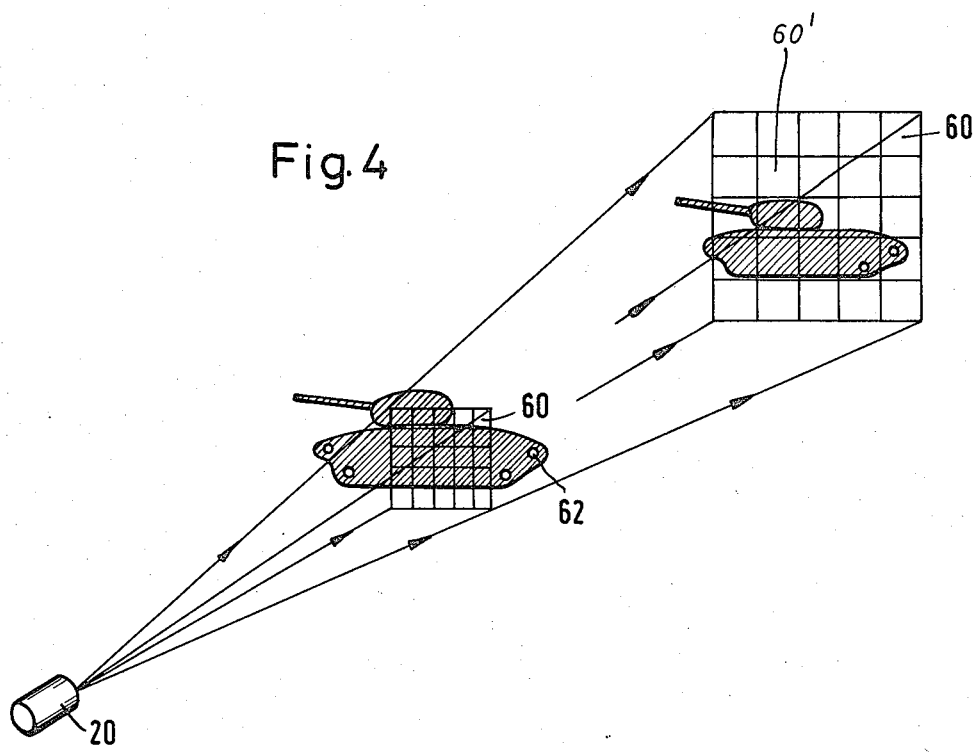
FIG. 4 illustrates diagrammatically the dependence of the sectorial evaluation upon the distance of the target.

Turning now to the figures and first to FIG. 1, a number (e.g. five) of semi-conductor diodes (Ga-As diodes) 12 for emiting laser light are arranged on a support 10. Each laser diode 12 has an active p-n transition region for the emission of laser light. The emitted laser light is in the infra-red region. In the uppermost diode shown in FIG. 1, the p-n region is indicated at 14, and its thickness is very small (approximately 2 um) in comparison to the height of each laser diode 12 (at least 0.1 mm). Consequently, the laser light tissues from the light outlet face (pointing to the right in FIG. 1) of each diode 12 from only a narrow line-like region. This linelike emitting region of each laser diode 12 is connected to a tape-like light conductor 16. Light conductor 16 is constructed from quartz, or a similar light-conducting material. The thickness of conductor 16 is at least as great as and preferably slightly greater than the laseractive layer 14, but considerably smaller than the thickness of a laser diode 12. The width of each light conductor 16 corresponds approximately to that of the laser diode 12. The light conductors 16 are approximately $40 \times 200$ microns in cross-section, and may be constructed with external covers.

As may be seen from FIG. 1, the free ends of the light conductors 16 are placed together without gaps to form an approximately square light outlet face 18 which, according to the number and form of the light conductors 16 shown, is divided into five parallel strips. In FIG. 1, these strips extend perpendicular to the plane of the drawing. The light outlet face 18 is located in the focal plane of an optical projection assembly indicated by lens 20 which projects the emitted laser light into the field of view essentially parallel. However, the emitted laser light does diverge. For example, the laser light emitted by the middle laser diode 12' through the light conductor 16' is projected into a central space angle region 22 with a divergence proportional to the ratio of the dimensions of the light conductor 16' and the focal length of the optical assembly 20. For the embodiment illustrated in FIG. 1, the space angle region measurement is 0.25 microradians vertically and 1.25 microradians horizontally. This strip-like space angle sector is filled homogeneously by the laser light. The laser light issuing from the next-adjacent laser diodes is projected by the optical assembly 20 into the space angle sectors which follow immediately thereabove or therebelow, with the same divergence. If it is assumed that a projection screen has been erected at some spacing from the optical assembly 20, each strip-like field a, b, c, d, and e, abutting each other without gaps, would respectively be illuminated by laser light from a single diode 12. This projected image is illustrated diagrammatically in the right-hand portion of FIG. 1.

The embodiment of the invention described so far, including the laser diodes 12, light conductors 16 and optical assembly 20, constitutes a laser light transmitter which produces an approximately square field (all five strips a, b, c, d, and e together) that is illuminated homogeneously with a very high energy density, provided that all the laser diodes 12 are controlled simultaneously and without difference. The described transmitter constitutes an extremely advantageous arrangement for producing a homogeneous laser light bundle of high energy density. Because of their very small dimensions, the light conductors may be regarded as nearly point-like light sources of which the entire transmission energy from each of its associated laser diodes 12 has been preserved and transmitted to the conductor's end.

Still referring to FIG. 1, the individual laser diodes 12 may be controlled by means of a control device 23 in such a manner that the space angle sectors a, b, c, d, and e are illuminated with laser light in a certain chronological succession and/or in a pulse-like manner with a certain coding. With either method, a differentiation between the individual sectors is possible. As mentioned above, the nearly point-like light source ensures that the strip-shaped sectors are projected with an extremely small divergence, and abutting each other without gaps.

Also illustrated in FIG. 1 are five photo-electronic receiving elements 24, such as photo-diodes or, in particular, avalanche diodes. These diodes may likewise be attached to a common support (not illustrated). Each diode has an active region which responds to laser light of the same frequency as that emitted by diodes 12 to produce a detector response signal. Each of these active regions are similarly connected to tape-shaped light conductors 26 whose free ends are placed together to form a gap-less light entry face 28 divided into corresponding strips. The individual light conductors 26 and the light entry face 28 has the same cross-sectional dimensions as the light conductors 16 and the light emitting face 18, respectively. The light entry face 28 formed by the ends of the light conductors 26 is coupled to the optical assembly 20 by means of a partially transparent guide mirror 30 (beam splitter), and lies in the focal plane thereof. The strips forming the light entry face 28, i.e. the end cross-sections of the individual light conductors 26, extend in FIG. 1 parallel to the plane of the drawing. That is, rotated about the optical axis of the optical assembly 20 through 90° relatively to the light outlet face 18.

The middle diode 24', as shown in FIG. 1, will be able to receive, through its light conductor 26' and the optical assembly 20, only the light which originates from a middle strip-like segment C of the imaginary projection screen target field. This strip C extends vertically, and thus, at a right angle to the strip-like sectors a, b, c, d, and e. Each diode 24 is correspondingly associated with one of the vertical strip-like sectors A, B, C, D, or E of the field of view. For this embodiment, the small dimensions of the inlet ends of the light conductors 26, and their gap-less disposition, ensure that the space angle sectors associated with the receiving diodes 24 have a very small divergence and abut each other without gaps. Further, the field of view of the receiving diodes 24 correspond to the field of view illuminated by the laser diodes 12. The diodes 24 are connected to an evaluating device 32 which is connected to a common computer 34. Control device 23, which controls emitting diodes 12, is also connected to computer 34.

For the purpose of firing simulation, target objects (armoured vehicles, helicopters and the like) are each fitted with an optical reflector suitable for reflecting laser light. Computer 34 delivers the command signals for the control device 23, and monitors the signals generated by evaluating device 32. The signals from unit 32 indicate which of the receiving diodes 24 has received reflected light from an object located in the target region, and also, the intensity of that reflected light. From the command signals generated to control device 23, the laser diodes 12 that emitted the reflected light can also be determined. This information can, in turn, be used to determine in which of the 25 square fields (space angle sectors) into which the target region is divided that the reflecting target object is located.

The entire apparatus illustrated in FIG. 1 may be coupled to a weapon (not shown) with an optical sight. The apparatus can be adjusted so that the optical axis of the optical assembly 20 corresponds to the sight axis of the optical sight. In such a case, the computer 34 can then compute the vertical and horizontal off-aim location of the target hit by the laser light. The location of the target off the sight line can be stored in a store 36 and/or rendered visible on an indicating device 38, e.g. a screen 40 on which a set of sight crosshairs 42 and a mark 44 representing the target are displayed. The computer 34 may be constructed in the manner of a microprocessor, and is connected to a trigger 48 for releasing the "shot", i.e. the complete transmitting, receiving and evaluating cycle. Operating conditions for the release of the shot and evaluation of the reflected light may be inserted into computer 34 by a store 46. These operating conditions, such as the kind of ammunition used and the desired assessment of the detected deviations from the reference point to be sighted, permit a determination of whether there has been a "hit" or a "miss". Additionally, the evaluation of the transmitted and reflected light is performed as a function of the distance to the target. That is, the actual target distance is detected by means of a distance measuring stage 50. The target distance determination is based on the elapsed time from transmission of the laser beam to detection of the reflected laser light by one of the diodes 24. This time measurement is supplied to the computer 34 by distance measuring stage 50.

As illustrated in FIG. 4, the size of the target region 60, which is illuminated by the laser diodes 12 corresponding to the strips a to e and strips A to E (see FIG. 1), increases with increasing distance of the target in accordance with the rules of the geometric spread. A target 62 located at a short distance would be covered only partially by the entire target region 60, whereas a target of the same size but at a greater distance would not fill all the strip-like fields a to e and A to E, respectively. In order to obtain an approximate constant coverage, and assessment of the target or the hold-on accuracy, respectively, as a function of the distance to the target, when computer 34 executes the evaluation according to distance, the signals produced by the reflected light from the outer regions of the expanding target field 60 are not taken into account. Only the signals from a smaller target region 60' comprised of strips b, c, d, and B, C, D (see FIG. 4), are analyzed.

The computer 34 may be programmed to perform this narrowing of the target field such that when certain distances are exceeded, computer 34 no longer takes into account laser light from the uppermost and lowermost laser diodes 12 in FIG. 1 (strips a and e) as well as light received by the outermost receiving diodes 24 (strips A and E). Thus, a step-like narrowing of the target field results. Computer 34 could also be programmed to continuously narrow the target field with distance by taking into account the relative intensity of the received laser light indicated by the signals from the receiving diodes 24.

From a comparison of the intensity of the received signals from the strips a to e and A to E of the field of view, it is possible to perform the off-aim location determination of the target (position of the target off the line of sight) with a greater accuracy than merely indicating the target's position with respect to five horizontal and five vertical strips. For example, when a comparison is performed by means of the computer 34 between the intensity of the reflected laser signals and the codings which correspond to the laser light emitted by the two uppermost laser diodes 12 (see FIG. 1), the exact location of the reflecting target within the two strips a and b can be determined. By interpolation, the target's deviation from the border line between a and b can be determined, at least approximately. In the same way, using the codings of the three remaining laser diodes 12 and the signals generated by the various receive diodes 24, the location of the target within strips c, d and e may also be determined. The intensity of the signal from receive diodes 24 determine in which of strips A to E the target was located.

The connection of the laser diodes 12 to the light conductors 16 on the support 10 (and correspondingly the receiving diodes 24 on their support) is preferably accomplished in an integrated manner. According to FIG. 2, which is an illustration of a typical laser diode 12 assembly, the laser diode 12 is fixed on a heat sink plate 64, and is connected by appropriate leads 66 to the electronic circuit assembly 68 (transistors, resistors, etc.) which comprise the interface circuit for the diodes. The light conductor 16 is fixed to the light outlet face 14 (see FIG. 1) of the diode 12 by means of a suitable adhesive or cement 70. These plates 64, with the elements mounted thereon in accordance with FIG. 2, are the sub-units which are attached to the support 10 in a step-wise off-set arrangement as illustrated in FIG. 3. As shown in FIG. 3, the ends of the light conductors 16 are placed together and fixed at 18. The output signal leads from the electrical circuit assemblies 68 are led to plug-in contracts 72 so that the whole support 10 forms a laser transmitter of integrated construction which can easily be connected to a supply and to control unit 23.

The invention is not limited to the embodiment described above. The off-aim location determining apparatus according to FIG. 1 may be modified in such a manner that the diodes 24 are also constructed as laser transmitting diodes. Diodes 24 then transmit into each one of the vertical strips A to E of the target field 60 pulsed laser light with different chronological off-set or pulse coding in the same manner as the horizontal strips a to e receive laser light pulses from the transmitting diodes 12. Additionally, this alternate embodiment of the invention comprises a single receiver (not illustrated in FIG. 1), and the reflected signals received by this receiver will always comprise a combination of pulse codings which are associated with one of the diodes 12 and one of the diodes 24. Because of this combination, one of the 25 fields of the target field 60 can always be identified unambiguously.

In yet another embodiment of the invention, the arrangement of FIG. 1 could be modified so that not only diodes 24, but also diodes 12 are constructed as receiving diodes. In this embodiment, a laser transmitter (not illustrated in FIG. 1), such as a Ga-As solid body semiconductor laser, is required. For this type of laser transmitter, no pulse coding is required for the laser light. Thus, the off-aim target location determination is obtained merely by identification of which pair of diodes, 24 and 12, received simultaneously reflected laser light.

In each embodiment, the crossed arrangement, i.e. the 90° relationship of the strip-like light conductor ends at the light outlet and light inlet faces 18, 28, respectively, result in the division of the sight field 60 into horizontal and vertical strips, and therefore, a division of the sight field into $n^2$ fields with only 2n opto-electronic elements (in the alternate embodiments $2n+1$).

Further modifications to the invention as illustrated in FIG. 1 are possible, such as varying the focal length of the optical assembly 20. By varying the focal length, the size of the target field 60 comprised of horizontal and vertical strips of laser light is changed according to the target distance measured in the distance measuring stage 50. For this purpose, the optical assembly 20 may be constructed with a variable or zoom lens assembly, and may be actuated by the use of a servo motor.

It is possible to modify the embodiment illustrated in FIG. 1 such that the light conductor ends 18, 28 are not exactly in the focal plane of the optical assembly 20, that is to say, in the image plane for infinite distance. Rather, the focus point is off-set slightly from that focal plane. Owing to this "defocussed" arrangement, the individual strip-like space angle sectors have a greater divergence and overlap each other. Thus, the covered field 60 in the target region is divided into a larger number of distinguishable matrix fields. That is, a new strip is produced by the overlapped light and pulse coding from the first and second laser diodes 12. This new strip lies between the strips a and b. In a similar manner, the overlapping of the other strips produce the remaining new strips. As a result, the angular resolution can be increased during the off-aim location determination, or the number of the transmitting and receiving elements required can be reduced.

The small space requirement of the preferred arrangement makes it possible to accommodate the entire transmitting and receiving unit within the casing of a usual weapon sight or a location finding unit, and to intergrate it with the optical assembly of the sight. It is also possible to construct the unit as a separate apparatus of smaller size which can be arranged in front of the inlet opening of a weapon sight and fixed thereto.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement or parts, for example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A shot simulating apparatus for determining the off-aim distance between the line of sight of a shot-simulator emitting laser light and a target capable of reflecting laser light, comprising:
    (a) an optical assembly which has its optical axis parallel to said line of sight and which defines a target field, said assembly including a beam splitter defining first and second image planes of said optical assembly;

(b) a laser transmitter having n opto-electronic laser emitter elements coupled to flat optical conductors, for transmitting laser light into said target field, said conductors having their free ends arranged approximate said first image plane to form a first area divided into n parallel strips corresponding to a first set of n parallel space angle segments projected by said optical assembly on said first image plane;

(c) a laser receiver having n opto-electronic laser detector elements coupled to flat optical conductors, for receiving laser light from said target field, said conductors having their free ends arranged at least near said second image plane to form a second area divided into n parallel strips corresponding to a second set of n parallel space angle segments projected by said optical assembly on said second image plane, said first and second areas of n parallel strips being perpendicular to each other about said optical axis so as to divide said target field into $n^2$ space angle sectors;

(d) a control means, for controlling said laser emitter elements to emit individually time-coded laser light selectively into the space segments of said first set; and (e) an off-aim determining means, for evaluating the vertical and lateral off-aim distance of a reflecting target by identifying the space angle sector from which reflected laser light is received through identification of the time code and the receiving detector elements.

2. The apparatus as claimed in claim 1, wherein said laser emitter elements comprise laser transmitting semiconductor diodes and said laser detector elements comprise light-sensitive avalanche diodes.

3. The apparatus as claimed in claim 1, wherein said off-aim determining means includes means for comparing the light intensities of laser light received from two adjacent space angle segments to perform an interpolated off-aim determination.

4. The apparatus as claimed in claim 1, wherein said off-aim determining means includes means for comparing the determined off-aim distance with an apparant standard target size.

5. The apparatus as claimed in claim 1 or 4, further comprising target distance determining means.

6. The apparatus as claimed in claim 5, wherein said off-aim determining means is controlled in response to the determined target distance so that, as the target distance increases, detection signals from light received from the space angle sectors located further away from the line of sight are valued less, the dimension of a total evaluated target area remaining approximately constant independently of the target distance.

7. The apparatus as claimed in claim 5, wherein said target distance determining means is responsive to the travel time of the laser light emitted by said laser emitter elements and reflected by said target.

8. The apparatus as claimed in claim 5, further comprising means for converting said determined target distance into a travel time of a simulated projectile.

9. The apparatus as claimed in claim 8, further comprising means for continuously repeating said transmission of laser light and said evaluation of reflected laser light signals for off-aim determination during a period of time corresponding to said travel time of a simulated projectile.

10. The apparatus as claimed in claims 1, 2, 3 or 4, further comprising a display unit responsive to said off-aim determining means for displaying the location of the target relative to the line of sight.

11. The apparatus as claimed in claim 5, further comprising a display unit responsive to said off-aim determining means for displaying the location of the target relative to the line of sight.

12. The apparatus as claimed in claim 6, further comprising a display unit responsive to said off-aim determining means for displaying the location of the target relative to the line of sight.

13. The apparatus as claimed in claim 7, further comprising a display unit responsive to said off-aim determining means for displaying the location of the target relative to the line of sight.

14. The apparatus as claimed in claim 8, further comprising a display unit responsive to said off-aim determining means for displaying the location of the target relative to the line of sight.

15. The apparatus as claimed in claim 9, further comprising a display unit responsive to said off-aim determining means for displaying the location of the target relative to the line of sight.

* * * * *